J. L. CHESNUTT.
BALL BEARING CASTER.
APPLICATION FILED MAY 14, 1917.
1,232,655.
Patented July 10, 1917.
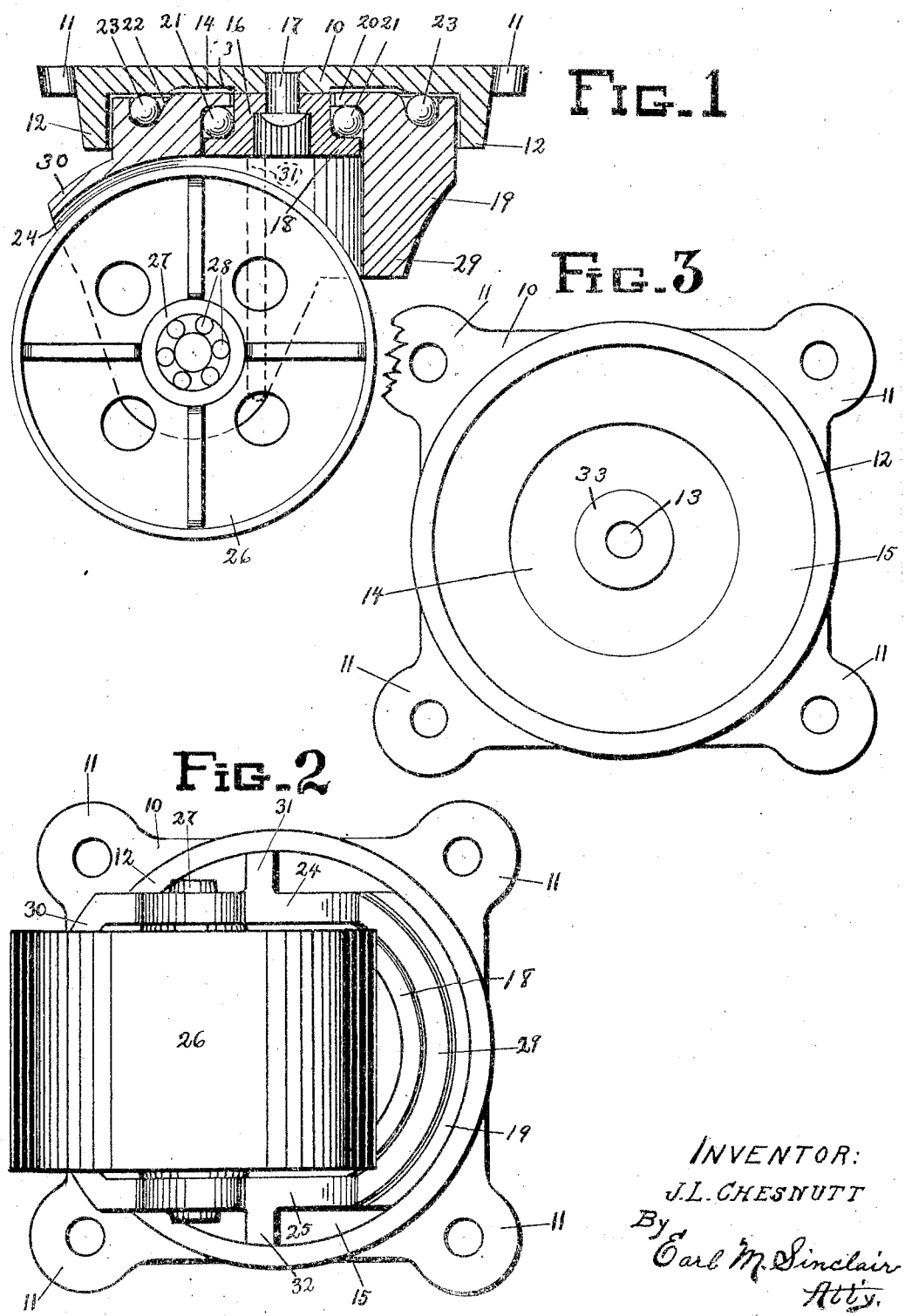
INVENTOR:
J. L. CHESNUTT
By Earl M. Sinclair
Atty.

UNITED STATES PATENT OFFICE.

JOHN LOUCIEN CHESNUTT, OF KANSAS CITY, MISSOURI.

BALL-BEARING CASTER.

1,232,655.   Specification of Letters Patent.   Patented July 10, 1917.

Application filed May 14, 1917. Serial No. 168,473.

*To all whom it may concern:*

Be it known that I, JOHN LOUCIEN CHESNUTT, citizen of the United States of America, and resident of Kansas city, Jackson county, Missouri, have invented a new and useful Ball-Bearing Caster, of which the following is a specification.

The object of this invention is to provide an improved construction for ball-bearing casters for trucks, furniture and the like.

A further object of this invention is to reduce to the minimum the friction between the wheel-bearing member and the load-carrying member, so that the wheel-member and wheel will swivel with the application of a minimum amount of force, and turn quickly when the direction of travel of the load-carrying portion is altered, and with a minimum of binding and wear between the two parts of the caster and on the supporting surface.

A further object of this invention is to produce a caster that will swivel or turn instantly under pressure and without perceptible dragging or sliding, thereby reducing the wear on the supporting surface.

A further object of this invention is to provide a caster which shall be eminently effective and yet simple and inexpensive in construction.

A further object of this invention is to provide improved means for connecting the wheel-carrying member to the load-bearing member.

My invention consists in the construction, arrangement and combination of elements hereinafter set forth, pointed out in my claims and illustrated by the accompanying drawing, in which—

Figure 1 is a vertical section of my improved caster, the wheel being shown in full lines. Fig. 2 is a bottom plan of the caster. Fig. 3 is a bottom view of the top plate detached.

In the construction of the device as shown the numeral 10 designates a top plate, which plate is formed with four equally spaced apertured ears 11 by which the caster may be attached to a body adapted to be supported thereby, by means of screws, bolts or other suitable securing devices. The plate 10 is formed with an integral, annular, downwardly projecting flange 12 of a diameter approximating the transverse dimension of the plate, which flange adds strength to the plate and prevents springing or breaking under a load. The plate 10 also is formed with a hole 13 in its center.

The top plate 10 is formed with an annular groove 14 in its lower face concentric with the hole 13 and the annular flange 12, and the periphery of said groove is spaced from said flange, whereby an annular flat or plane track 15 is provided between said members. Within the annular groove 14 a plane circular area or surface 33 is formed on the lower surface of the top plate, which area preferably is in the same horizontal plane as the track 15.

A cylindrical retaining member 16 is separately formed and adapted to be attached to the lower side of the top plate rigidly by a rivet 17 or other fastener passing through the central hole 13, said cylindrical retaining member being formed with a closed top adapted to receive said rivet and contacting with the circular area or surface 33. The retaining member 16 is formed with an integral, outwardly projecting flange 18 at its lower end.

A wheel-carrying member 19 is provided and is of generally cylindrical form, having a central opening or bore in which the retaining member 16 is mounted when the parts are assembled. The wheel-carrying member 19 is formed with an integral, inwardly projecting flange 20 at its upper end and bearing balls 21 are mounted between said flange and the flange 18 of the retaining member. The wheel-carrying member 19 also is formed with an annular groove 22 or ball race in its upper surface, and bearing balls 23 are mounted in said groove and contact with the plane track 15 of the top plate 10. The balls 21 serve to form a connection between the wheel-carrying member and the load-bearing member, by preventing separation of said wheel-carrying member from the top plate through perpendicular pressure between the horizontal flanges 18 and 20. The balls 21 also reduce friction between the wheel member and the retaining member 16 of the load-carrying device, and also produce lateral motion of the wheel member and wheel by horizontal pressure between the cylindrical side of the member 16 and the adjacent inner surface of the cylindrical wheel-carrying member 19. The balls 21 also prevent the wheel-carrying member from tipping downwardly in front when the wheel passes over an obstruction, and prevent and reduce binding friction and wear on the parts during passage over an obstruction. The balls 23 receive downward pressure only, because of the plane track 15 on which they receive pressure of the top plate, and serve to bear the load without lateral pressure, thereby permitting them to turn with less resistance and causing the caster to swivel easily and quickly.

The wheel-carrying member 19 is formed with spaced, downwardly projecting flanges or wings 24, 25, between which the wheel 26 is mounted. I have here shown the wheel 26 formed with an integral hub surrounding and spaced from an axle 27 carried by the wings 24, 25, and roller bearings 28 interposed between said hub and axle. The axle 27 has its ends projecting through the wings 24, 25 and upset or riveted to hold it in place.

The major portions of the wings 24, 25 are rearwardly of the vertical axis of the cylindrical wheel-carrying member 19 and of the retaining member 16, and the axle 27 also is rearwardly of such axis, so that the wheel 26 trails relative to the axis of the caster.

The forward margins of the wings 24, 25 are connected by a downwardly projecting arcuate flange 29 which forms a continuation of the forward portion of the main part of the cylindrical wheel-carrying member 19. The upper parts of the projecting rear portions of the wings 24, 25 are also connected by a web or plate 30 which projects rearwardly from the rear lower part of the cylindrical wheel-carrying member. The portions 29, 30 are provided to add strength to the wheel-carrying member in points receiving severe strain under a load, to prevent cracking or breaking of the casting. The wings 24, 25 are also formed with vertical strengthening ribs 31, 32 on their outer faces in front of the position of the axle 27.

The provision of the groove 14 in the bottom of the top plate 10 permits the central flanged portion of the wheel-carrying member 19 to project upwardly above the plane of the track 15, as shown in Fig. 1, thereby diminishing the distance between the upper surface of the top plate and the top of the wheel 26. In other words, it assists in procuring a maximum diameter for the wheel, an end which is desirable as the larger the wheel the more easily it rolls, particularly over rough or uneven surfaces, and the greater the diameter of the wheel in proportion to the total height of the device, the less tendency there will be for the wheel-carrying member to bind on the top plate or retaining member, as when the wheel is passing over obstructions.

Particular attention is called to the retaining member 16. This member, separately formed and providing a convenient means for connecting the wheel-carrying member 19 to the top plate 10, after the insertion of the balls 21, by the affixing of the rivet 17 or member equivalent thereto, is of relatively large diameter and is rigidly secured to and against rotary movement independently of said plate. The large diameter of the member 16, which thus forms the axis for rotation of the wheel and the member 19 relative to the load, acts to prevent binding and makes for smooth and easy action of the parts, and in this respect my construction presents a decided advantage over the common types of devices of this character. The easy and quick turning of the wheel-member relative to the load-member also acts to reduce and tends to prevent wearing of the supporting surface by the wheel, a fault which is found in many casters now in use.

It should also be noted that my construction presents an imperforate top plate, when assembled and in use, thus preventing the deposit of dirt and foreign substances in the ball races, which are further protected by the depending flange 12. The hole 13 of the top plate is relatively small and is entirely closed by the rivet 17, so that the device in use presents no axial opening such as is common in swivel casters.

I claim as my invention—

1. A swivel caster, comprising a top plate provided with means for attaching to a load, said top plate being formed with a downwardly projecting annular flange, and with an axial hole, a wheel-carrying member adapted to be mounted within the annular flange of the top plate and formed with an annular ball race in its top, bearing balls carried by said race and adapted to contact with the under surface of said top plate, said wheel-carrying member being formed with a central circular opening and with a horizontal inwardly projecting flange at the margin of said opening, a retaining member of cylindrical form closed at its top except for an axial hole by which it is adapted to be riveted to said top plate, said retaining member being formed at its bottom with a horizontal, outwardly projecting flange beneath the flange of said wheel-carrying member, bearing balls mounted between said flanges, and a wheel carried by said wheel-carrying member.

2. A swivel caster, comprising a top plate provided with means for attaching to a load, said top plate being formed with a downwardly projecting annular flange, a wheel-carrying member adapted to be mounted within the flange of the top plate and formed with an annular ball race in its top, bearing balls in said race adapted to contact with the under surface of said top plate, said top plate also being formed with an annular groove into which a portion of said wheel-carrying member may project, said wheel-carrying member being formed with a central circular opening and a horizontal flange inwardly projecting at the top thereof, a retaining member of cylindrical form and closed at its top and rigidly secured to the top plate, said retaining member being formed with an outwardly projecting flange below the flange of the wheel-carrying member, bearing balls mounted between said flanges, and a wheel rotatably mounted in said wheel-carrying member.

3. In a swivel caster, a top plate formed with an axial opening, a wheel-carrying member of cylindrical form formed with a ball race in its top, said wheel-carrying member being formed with an inwardly projecting horizontal flange at its top, bearing balls in said ball race and adapted to contact with the under surface of said top plate, a retaining member open at its bottom and closed at its top except for a hole, a rivet passing through and rigidly connecting the top of said retaining member to said top plate, said retaining member being formed with an outwardly projecting horizontal flange below the flange of the wheel-carrying member, bearing balls mounted between said flanges, and a wheel rotatably carried by said wheel-carrying member, said retaining member and the last mentioned bearing balls providing the only means for transmitting propelling force from the top plate to the wheel-carrying member.

4. In a swivel caster, a top plate, a cylindrical wheel-carrying member, a retaining member of cylindrical form adapted to be riveted to said top plate, said wheel-carrying member and retaining member being formed with oppositely projecting, vertically spaced horizontal flanges, bearing balls interposed between said flanges, said wheel-carrying member being formed with spaced, downwardly projecting wings, a wheel rotatably mounted between said wings, the axis of said wheel being rearwardly of the axis between said top plate and wheel-carrying member, said wheel-carrying member being formed with a downwardly projecting flange in front of and connecting said wings and also formed with a rearwardly projecting flange at its rear side connecting said wings.

5. A swivel caster, comprising a top plate formed with an annular, downwardly projecting flange, a wheel-carrying member cylindrical in its upper portion rotatably mounted within the flange of said top plate, said top plate being formed with an annular groove in its central portion into which the central portion of the wheel-carrying member may project and also formed with a plane track between said groove and the flange, said wheel-carrying member being formed with a ball race in its top, bearing balls in said race and contacting with the plane track of said top plate, a retaining member of cylindrical form and closed at its top and rigidly secured to the central portion of said top plate, said retaining member and the wheel-carrying member being formed with vertically spaced, oppositely extending horizontal flanges, bearing balls interposed between said flanges, and a supporting wheel rotatably carried by and projecting below said wheel-carrying member, the last mentioned bearing balls receiving all of the lateral strain between the wheel-carrying member and the top plate and its load.

Signed by me at Kansas City, Missouri, this 12" day of April, 1917.

JOHN LOUCIEN CHESNUTT.